(12) United States Patent
Tetsuka et al.

(10) Patent No.: US 7,105,961 B2
(45) Date of Patent: Sep. 12, 2006

(54) LEAD TERMINAL STRUCTURE OF RESOLVER

(75) Inventors: Tsuneo Tetsuka, Omori-nishi (JP); Naohiko Aoyama, Omori-nishi (JP)

(73) Assignee: Minebea Co., Ltd., Miyota (JP)

( * ) Notice: Subject to any disclaimer, the term of this patent is extended or adjusted under 35 U.S.C. 154(b) by 449 days.

(21) Appl. No.: 10/224,350

(22) Filed: Aug. 21, 2002

(65) Prior Publication Data

US 2003/0071527 A1  Apr. 17, 2003

(30) Foreign Application Priority Data

Oct. 12, 2001  (JP) .............................. 2001-315779

(51) Int. Cl.
   *H02K 5/22*  (2006.01)
(52) U.S. Cl. .............................. 310/71; 310/87; 310/43
(58) Field of Classification Search ................. 310/71, 310/87, 43
   See application file for complete search history.

(56) References Cited

U.S. PATENT DOCUMENTS

| | | | | |
|---|---|---|---|---|
| 2,813,692 A | * | 11/1957 | Peterson et al. ............... | 310/71 |
| 3,500,085 A | * | 3/1970 | Smith ........................ | 310/68 R |
| 3,502,917 A | * | 3/1970 | Bizoe ........................ | 310/71 |
| 3,816,641 A | * | 6/1974 | Iversen ........................ | 174/76 |
| 4,033,535 A | * | 7/1977 | Moran ........................ | 439/449 |
| 4,289,923 A | * | 9/1981 | Ebert ........................ | 310/71 |
| 4,429,243 A | * | 1/1984 | Crow ........................ | 310/71 |
| 4,626,721 A | * | 12/1986 | Ouchi ........................ | 310/71 |
| 6,417,588 B1 | * | 7/2002 | Niimi et al. ................ | 310/71 |
| 6,716,063 B1 | * | 4/2004 | Bryant et al. ............... | 439/589 |
| 6,750,577 B1 | * | 6/2004 | Mimura ........................ | 310/71 |
| 6,756,709 B1 | * | 6/2004 | Kobayashi et al. .......... | 310/43 |

FOREIGN PATENT DOCUMENTS

| | | | |
|---|---|---|---|
| DE | | 3426973 A1 * | 1/1986 |
| EP | | 0 905 861 A2 | 3/1999 |
| JP | | A 55-147939 | 11/1980 |
| JP | | A 59-70163 | 4/1984 |
| JP | | A 61-121737 | 6/1986 |
| JP | | A 6-327177 | 11/1994 |
| JP | | A 11-98747 | 4/1999 |

* cited by examiner

*Primary Examiner*—Darren Schuberg
*Assistant Examiner*—Yahveh Comas
(74) *Attorney, Agent, or Firm*—Oliff & Berridge, PLC (57) ABSTRACT

A lead-wire-fixing attachment for fixing a lead wire is provided in a lead-wire-fixed portion arranged in a stator core, and a lead wire is connected to a stator-winding mounting board by way of a through-hole provided at the upper end of the lead-wire-fixing attachment. The through-hole is formed by notches provided at a location where the first attachment and second attachment contact each other. An inlet passage through which a potting material is poured, outlet passages through which the potting material runs out, base portions which are inscribed in the inside wall of the lead-wire-fixed portion are formed in the upper portion of the lead-wire-fixing attachment. The lead wire is made to pass through the through-hole and the lead-wire-fixing attachment is inserted in the lead-wire-fixed portion, and then they are fixed by using a potting material.

11 Claims, 6 Drawing Sheets

LEAD TERMINAL STRUCTURE OF RESOLVER

BACKGROUND OF THE INVENTION

1. Field of the Invention

The present invention relates to a lead terminal structure of a resolver, particularly a high-quality resolver with improved assembling efficiency so as to enhance a mass productivity.

2. Description of the Related Art

In a conventional resolver, a lead wire is fixed in a slot of a stator core and the end portion of a coil is connected to the lead wire by soldering. In the resolver thus constructed, connecting the lead wire with the coil by soldering has been troublesome, the condition in connecting by the soldering is varied, thereby making the workability and reliability difficult to improve.

For solving the above problems, Japanese Unexamined Patent Publication No. 11-98747 can be shown as one example. Such a lead terminal structure of a resolver is shown in FIG. 7.

Figure 7:
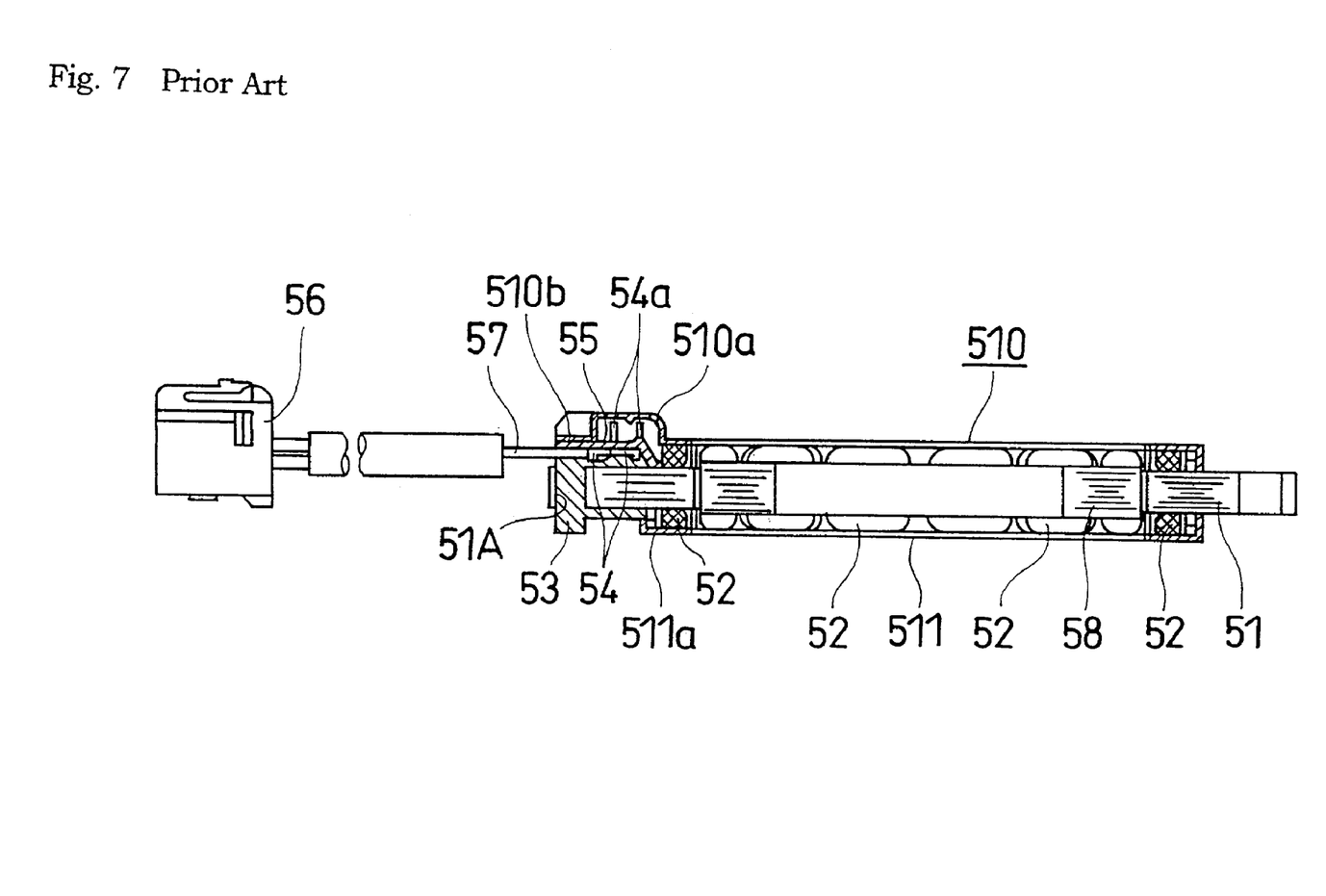
FIG. 7 is a sectional view of a lead terminal structure of a conventional resolver.

In FIG. 7, the entire shape of a stator core 51 is ring-shaped and constructed in a multilayer form, and, for example, a conventional coil 52 of a single-phase excitation and two-phase output type is provided in a slit (not shown) along the inside edge of the stator core 51. An under-cover 53 U-shaped in section is provided at an end portion 51A of the stator core 51. On the upper surface of the undercover 53, at least one terminal pin is held and a pin-holder 55 made of a plastic material is provided.

Protrusions 54a of terminal pins 54 pass through the pin-holder 55 and are protruded upward, and the end portion of the coil 52 is connected to the protrusions 54a. Furthermore, the terminal pins 54 are connected to a connector 56 via a lead wire 57 by a conventional solderless contact. Moreover, although not illustrated, the under-cover 53 is inserted in a slot of the stator core 51.

A rotor 58, which is constructed in a ring-shaped and a multilayer form, and is a variable reluctance type (VR type) in this embodiment, is rotatably provided inside the stator core 51, and ring-shaped first and second coil protection covers 510 and 511 are provided on both surfaces of the stator core 51. This first coil protection cover 510 covers the upper surface of each coil 52 and also concurrently covers the pin-holder 55 and the protrusions 54a. A bulging portion 510a protruded to cover the protrusions 54 is integrally formed at a place where the protrusions 54a are provided. An end portion 510b of the first coil protection cover 510 is fixed to the pin holder 55 by welding, an adhesive, etc. The second coil protection cover 511 covers the under surface of each coil 52 and its end portion 511a is fixed to the under-cover 53 by welding, an adhesive, etc.

In the lead terminal structure of a resolver, the pin-holder 55 holding terminal pins 54 to which the lead wire 57 is connected is provided on the under-cover 53 arranged in the stator core 51, and the coil 52 is directly connected to the terminal pins 54. The first coil protection cover 510 covers the upper surface of each coil 52 and concurrently covers the pin-holder 55 and the protrusions 54a and is fixed to the pin-holder 55 by welding, an adhesive, etc. Therefore, those members described above can be effectively protected from mechanical damages but not enough for poor surroundings such as moisture, vibration, impact, etc.

Figure 8:
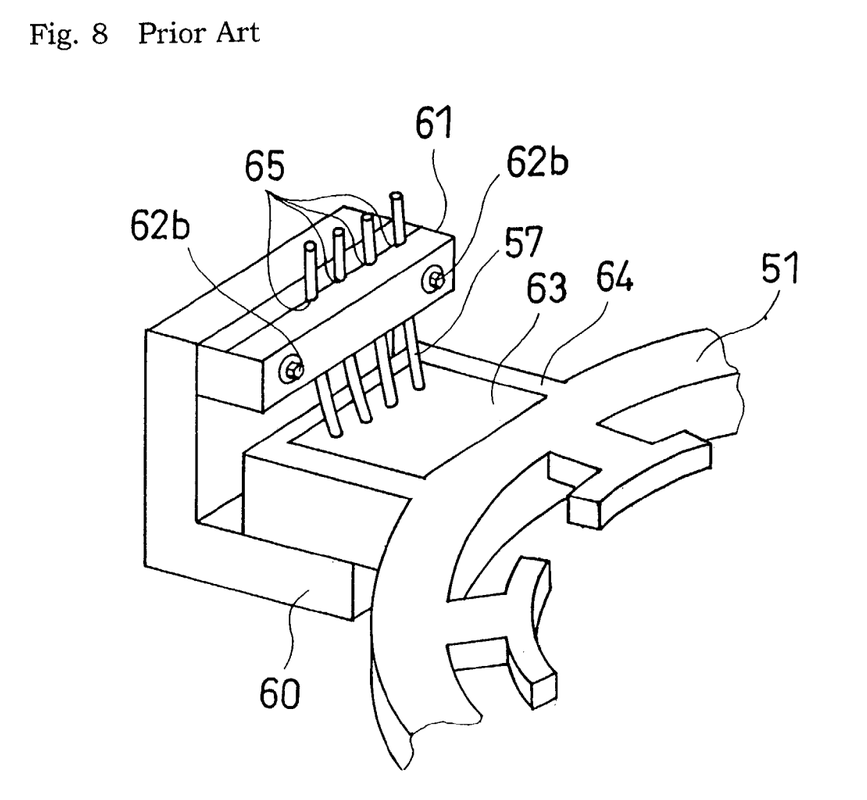
FIG. 8 is an outward appearance of a lead terminal structure of another conventional resolver.

The conventional lead terminal structure of a resolver enabling to withstand the poor surroundings is shown in FIG. 8. In the structure, problems due to moisture, vibration, impact, etc., are solved such that the end portion of the stator coil and the lead wire are fixed by using a potting material.

In FIG. 8, the stator core 51 is provided with a lead-wire-fixed portion 64. A wiring board (not shown), to which the end portion of the stator coil (not shown) and lead wires 57 are connected, is provided inside the lead-wire-fixed portion 64. The potting material is poured into the lead-wire-fixed portion 64 so that the lead wire 57 may not be twisted and each of them may stand upright and with a substantially equal distance therebetween by using lead-wire fixing jigs 60 and 61 for fixing the lead wires. That is, the lead-wire fixing jig 60 is fixed to the lower end portion of the lead-wire-fixed portion 64 by screws (not shown), etc., so that the lead-wire-fixed portion 64 may be horizontal. The lead wires 57 are made to pass through notches 65 provided at the location where the lead-wire fixing jigs 60 and 61 contact each other. The lead-wire fixing jig 61 is fixed to the lead-wire fixing jig 60 by using screws 62a and 62b. Thus, the lead wires 57 are fixed to the fixing jigs 60 and 62. Then, the end portion of the stator coil and the lead wires 57 are fixed with a potting material 63 such that a potting material is poured into the lead-wire-fixed portion 64. After the potting material 63 has been cured, the lead-wire fixing jigs 60 and 61 are removed from the lead-wire-fixed portion 64.

The lead terminal structure of the resolver shown in FIG. 8 solves problems due to moisture, vibration, impact, etc. except the following. That is, one set of lead-wire fixing jigs 60 and 61 will be required per resolver until the potting material 63 has been cured. Furthermore, an additional work for fixing the lead-wire fixing jigs 60 and 61 to a resolver, for example, the lead-wire-fixed portion 64 is required, and after the potting material 63 has been cured, the lead-wire fixing jigs 60 and 61 should be removed from the lead-wire-fixed portion 64. Moreover, since the lead wires are fine, the work efficiency making the lead wires 57 passed through the notches 65 becomes lessen while it also takes time to properly arrange the lead wires 57 with an equal space therebetween. In case each of the lead wires is not equally spaced such as touching with each other, that may cause faulty insulation.

Figure 9:
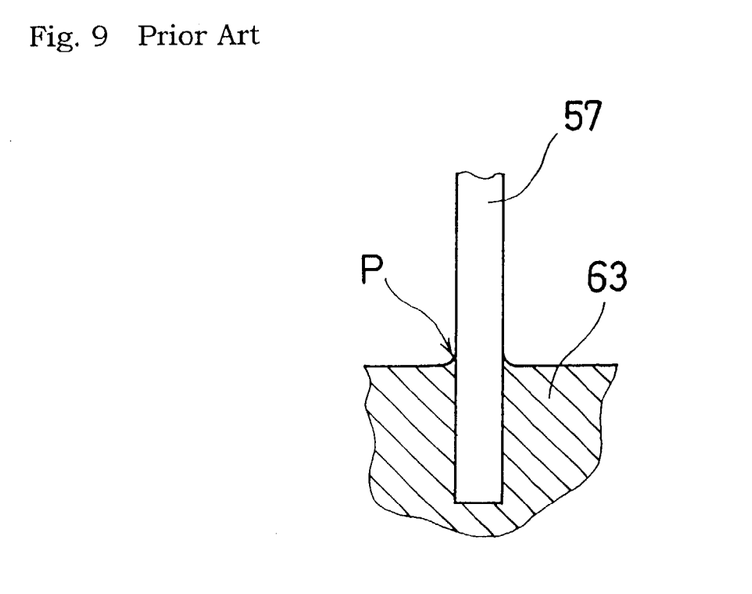
FIG. 9 is an enlarged view of the portion where a lead wire is in contact with a potting material in a lead wire structure of the other conventional resolver.

Furthermore, as shown in FIG. 9, a portion P where the lead wire 57 protrudes from the surface of the potting material 63 and is in touch with the potting material 63 has sharp edges when the potting material is cured. Therefore, after the potting material has been cured, when the lead wire 57 is bent, the lead wire 57 is easily damaged such as a break, a short circuit, etc.

SUMMARY OF THE INVENTION

Accordingly, it is an object of the present invention to provide a lead wire structure of a high-quality resolver, the assembling of which is improved and the mass production of which is excellent.

For attaining the above object, in a lead terminal structure of a resolver according to an aspect of the present invention, a ring-shaped stator core in which a fixed magnetic pole having a plurality of fixed pole shoes is protruded in the direction of the center of a ring-shaped yoke member and a plurality of plate-like members are laminated; a lead-wire-fixed portion in which a stator winding wound around the fixed pole shoes of the stator core is connected to a lead wire; a stator-winding mounting board, on which a fixing pin for fixing the stator winding is arranged so as to stand thereon, provided in the lead-wire-fixed portion; and a lead-wire-fixing attachment, at the upper end of which a through-hole for fixing the lead wire is provided, arranged above the stator-winding mounting board. The lead wire is connected to the stator-winding mounting board by way of the through-hole, and the lead-wire-fixed portion is filled with a potting material.

In a lead terminal structure of a resolver according to the present invention, the lead-wire-fixing attachment is formed by a first attachment and second attachment which fix the lead wire and a through-hole for fixing the lead wire is formed by notches provided at a position where both first and second attachments contact each other.

In a lead terminal structure of a resolver according to the present invention, an inlet passage for pouring a potting material and an outlet passage for the poured potting material to run out are provided in the upper portion of the lead-wire-fixing attachment.

In a lead terminal structure of a resolver according to the present invention, each of the lead-wire-fixed portion, the lead-wire-fixing attachment, and the potting material has a substantially equal thermal expansion coefficient.

In a lead terminal structure of a resolver according to the present invention, base portions inscribed in the inside wall of the lead-wire-fixed portion are formed in the lead-wire-fixing attachment.

In a lead terminal structure of a resolver according to the present invention, a protrusion is formed at the upper end of the lead-wire-fixing attachment and the portion where the protrusion and the lead wire contact each other is chamfered.

In a lead terminal structure of a resolver according to the present invention, the lead-wire-fixed portion is filled with a potting material such that the potting material does not exceed the upper end of the lead-wire-fixed portion and that the potting material does not exceed the portion, which is chamfered, of the protrusion of a through-hole provided at the upper end of the lead-wire-fixing attachment.

In a lead terminal structure of a resolver according to the present invention, in the lead-wire-fixing attachment, the first attachment and second attachment for fixing the lead wire is combined so that both attachments may be opened and closed at one end of the surfaces having the notches thereof.

BRIEF DESCRIPTION OF THE DRAWINGS

FIGS. 2A to 2G are sectional views for describing a lead-wire fixing attachment.

DESCRIPTION OF THE PREFERRED EMBODIMENTS

Figure 1:
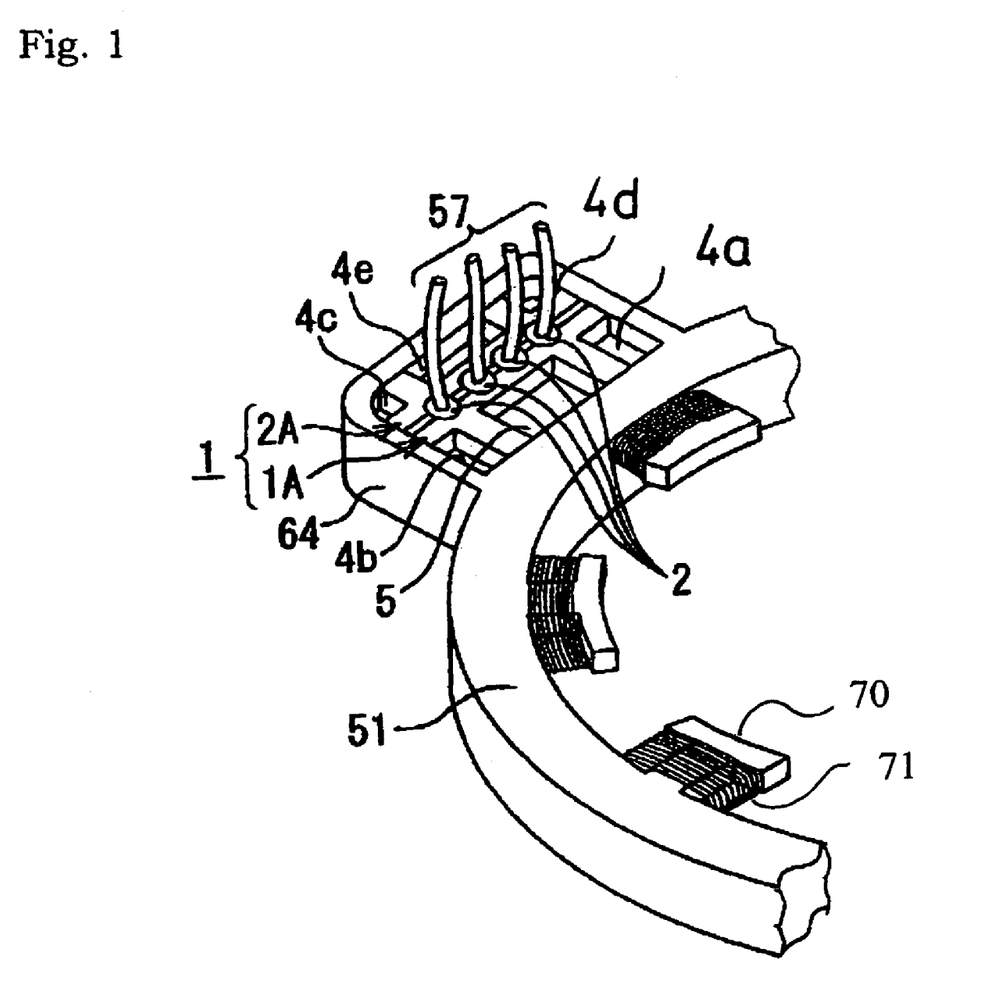
FIG. 1 is an outward appearance of a lead terminal structure of a resolver according to an embodiment of the present invention.

FIG. 1 is an outward appearance of a lead terminal structure of a resolver of according to an embodiment of the present invention. In FIG. 1, the same portion as in FIGS. 7 and 8 is given the same reference numeral. A stator core 51 is provided with a lead-wire-fixed portion 64, a plurality of fixed pole shoes 70 with a corresponding stator winding 71 wound thereon. The lead-wire-fixed portion 64 is provided with a stator-winding mounting board (shown in FIG. 3). Furthermore, a lead-wire-fixing attachment 1 (1A and 2A) for fixing lead wires 57 is provided in the upper portion of the stator-winding mounting board. The lead wires 57 are put into through-holes 2 provided on the upper end of the lead-wire-fixing attachment 1 (1A and 2A) from the upside and connected to the stator-winding mounting board (shown in FIG. 3). Moreover, the number of lead wires 57 is four and the number of through-holes is also four corresponding thereto, but the number is not limited thereto but may be any other number.

The lead-wire-fixing attachment 1 is composed of 1A and 2A. Hereinafter, the 1A and the 2A are designated as a first attachment and a second attachment, respectively. The through-holes 2 are formed by notches to be described later, which are provided at the position where the first attachment 1A and the second attachment 2A are in contact with each other. Furthermore, an inlet passage 5 into which a potting material is poured is provided in the lead-wire-fixing attachment 1. The potting material fixes the lead-wire-fixing attachment 1 and the stator-winding mounting board to the lead-wire-fixed portion 64.

Furthermore, base portions, which are inscribed in the inside wall of the lead-wire-fixed portion 64 to be described later, are formed in the lead-wire-fixing attachment 1. Outlet passages 4a, 4b, 4c, 4d, and 4e where the poured potting material flows out to the upper portion of the lead-wire-fixing attachment 1 are provided. Moreover, the thermal expansion coefficient of the lead-wire-fixed portion 64, the lead-wire-fixing attachment 1, and the potting material is substantially equal and they are made of the following materials. For example, PBT resin, polycarbonate resin, and thermoplastic resin are used for the lead-wire-fixing attachment 1, and one-component epoxy resin, two-component epoxy resin, etc., are appropriately selected and used for the potting material.

Figure 2A:
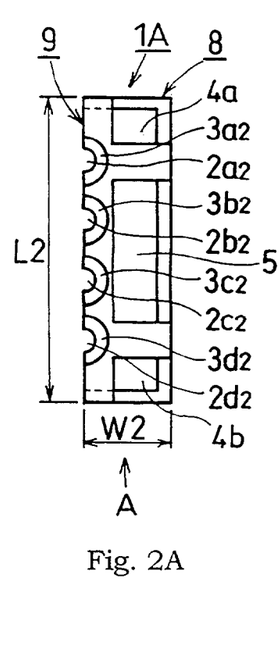
FIGS. 2A and 2B are top views of a first attachment and a second attachment, respectively.
Figure 2B:
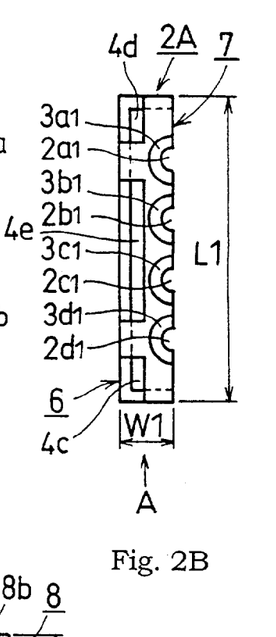
Figure 2C:
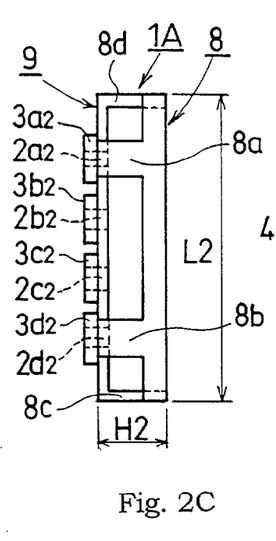
FIGS. 2C and 2D are a right side view and a left side view of the first attachment and the second attachment, respectively.
Figure 2D:
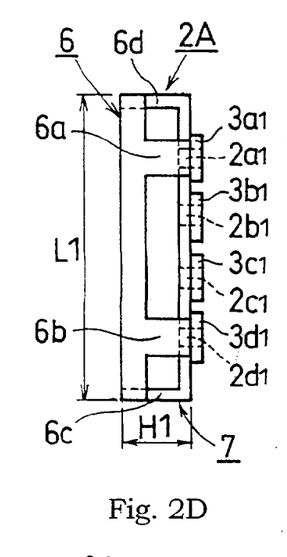
Figure 2E:
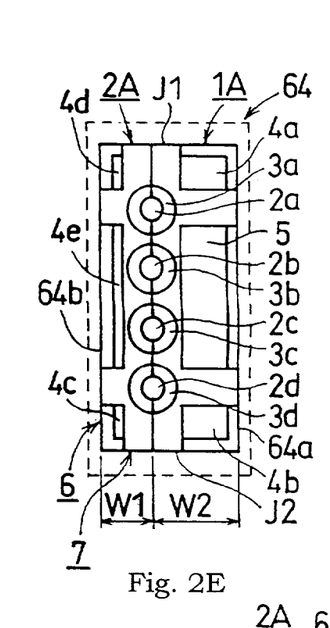
FIG. 2E is a top view of the case where the first attachment and the second attachment are provided so as to be inscribed in the inside wall of the lead-wire-fixed portion.
Figure 2F:
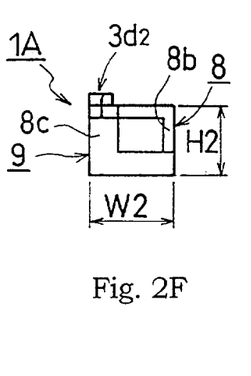
FIGS. 2F and 2G are front views when the first attachment and the second attachment in FIGS. 2A and 2B are seen from the direction of A, respectively.
Figure 2G:
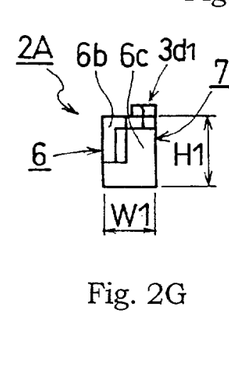

FIGS. 2A to 2G are sectional views describing the lead-wire-fixing attachment 1. FIGS. 2A and 2B are top views of the first attachment 1A and the second attachment 2A, respectively, and FIGS. 2C and 2D are a right side view and a left side view of the first attachment 1A and the second attachment 2A, respectively. Furthermore, FIG. 2E is a top view of the case where the first attachment 1A and the second attachment 2A are provided so as to be inscribed in the inside wall of the lead-wire-fixed portion 64 (shown by a broken line). Moreover, FIGS. 2F and 2G are front views when the first attachment 1A and the second attachment 2A in FIGS. 2A and 2B are seen from the direction of A, respectively. Here, as the inside wall of the lead-wire-fixed portion 64 (shown by a broken line) is shown in FIG. 2E, the short sides are designated as J1 and J2, and the long sides are designated as 64a and 64b.

As shown in FIGS. 2B and 2D, the second attachment 2A is formed by a top face portion 7 and a side face portion 6. That is, in the top face portion 7 having a width W1 and a length L1, notches 2a1, 2b1, 2c1, and 2d1 for forming through-holes 2a, 2b, 2c, and 2d on the top face are formed, and the outlet passages 4c, 4d, and 4e are formed on both ends and in the middle of the top face portion 7 and on the side of the top face portion 7 inscribed in the inside wall 64b of the lead-wire-fixed portion 64. The outlet passages 4c, 4d, and 4e are notches where the poured potting material runs out to the upper portion of the lead-wire-fixing attachment 1.

Furthermore, the side face portion 6 contains base portions 6a, 6b, 6c, and 6d by which the second attachment 2A is inscribed in the three side walls 64b, J2, and J1 of the lead-wire-fixed portion 64, and has a height H1 and the length L1. Protrusions 3a1, 3b1, 3c1, and 3d1 are formed around the notches 2a1, 2b1, 2c1, and 2d1 of the top face portion 7, respectively. Furthermore, as shown in FIG. 2D, the base portions 6a and 6b, in which the outlet passages 4c, 4d, and 4e of the top face portion 7 are not formed, inscribed in the inside wall 64b of the lead-wire-fixed portion 64 are integrally combined with the top face portion 7. Moreover, the base portions 6d and 6c, by which the top face portion 7 is inscribed in the inside walls J1 and J2 of the lead-wire-fixed portion 64, are integrally combined with the top face portion 7.

As shown in FIGS. 2A and 2C, the first attachment 1A is composed of a top face portion 9 and a side face portion 8 which are described later. That is, in the top face portion 9 having a width W2 and a length L2, notches 2a2, 2b2, 2c2, and 2d2 for forming the through-holes 2a, 2b, 2c, and 2d on the top face are formed, and the outlet passages 4a and 4b and the inlet passage 5 are formed on both ends and in the middle of the top face portion 9 and on the side, where the lead-wire-fixed portion 64 is inscribed in the inside wall 64a, of the top face portion 9. The input passage 5 is a notch for pouring the potting material, and the outlet passages 4a and 4b are notches where the poured potting material runs out of the upper portion of the lead-wire-fixing attachment 1. Furthermore, the side face portion 8 contains base portions 8a, 8b, 8c, and 8d by which the first attachment 1A is inscribed in the three inside walls 64a, J2, and J1 of the lead-wire-fixed portion 64, and has a height H2 and the length L2. Protrusions 3a2, 3b2, 3c2, and 3d2 are formed around the notches 2a2, 2b2, 2c2, and 2d2 of the top face portion 9.

Furthermore, as shown in FIG. 2C, the base portions 8a and 8b, in which the outlet passages 4a and 4b of the top face portion 9 are not formed, inscribed in the inside wall 64a of the lead-wire-fixed portion 64 are integrally combined with the top face portion 9. Moreover, the base portions 8d and 8c, by which the top face portion 9 are inscribed in the inside walls J1 and J2 of the lead-wire-fixed portion 64, are integrally combined with the top face portion 9.

As shown in FIG. 2E, the first attachment 1A and the second attachment 2A are inserted so as to be inscribed in the inside walls of the lead-wire-fixed portion 64 (shown by a broken line) such that the notches 2a1, 2b1, 2c1, and 2d1 face the notches 2a2, 2b2, 2c2, and 2d2 and that the protrusions 3a2, 3b2, 3c2, and 3d2 come to the upside. In such a case, the width of the lead-wire-fixing attachment 1 formed by the first attachment 1A and the second attachment 2A becomes W1 plus W2 and is substantially equal to the width defined by the inside walls of the lead-wire-fixed portion 64.

That is, the base portions 8a and 8b of the first attachment 1A are inscribed in the inside wall 64a of the lead-wire-fixed portion, and the base portions 6a and 6b of the second attachment 2A are inscribed in the inside wall 64a of the lead-wire-fixed portion. Furthermore, the portions where the outlet passages 4a and 4d are formed are inscribed in the inside wall J1 of the lead-wire-fixed portion, and the portions where the outlet passages 4b and 4c are formed are inscribed in the inside wall J2 of the lead-wire-fixed portion. At this time, the through-holes 2a, 2b, 2c, and 2d and the protrusions 3a, 3b, 3c, and 3d are formed by the notches 2a1, 2b1, 2c1, and 2d1 and the notches 2a2, 2b2, 2d2, and 2d2. Although not illustrated, lead wires are put through the through-holes 2a, 2b, 2c, and 2d as described below. That is, before the first attachment 1A and the second attachment 2A are inserted into the lead-wire-fixed portion 64, the lead wires are put in either of the notches 2a1, 2b1, 2c1, and 2d1 or the notches 2a2, 2b2, 2d2, and 2d2, and the first attachment 1A and the second attachment 2A are combined so as to face each other to make the lead wires pass through the through-holes 2a, 2b, 2c, and 2d.

Figure 3:
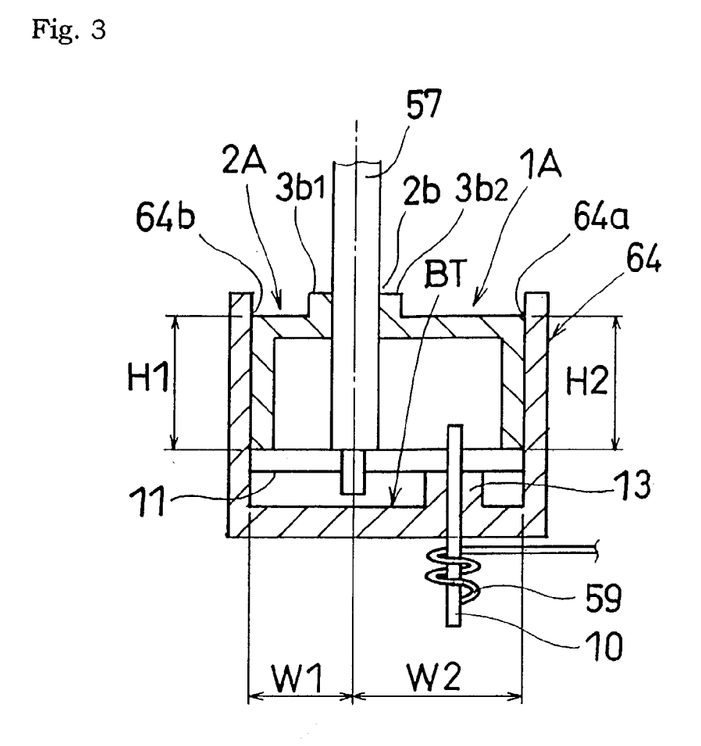
FIG. 3 is a sectional view of the first attachment, the second attachment, and the lead-wire-fixed portion.

FIG. 3 is a sectional view showing the first attachment 1A and the second attachment 2A, which are inserted as shown in FIG. 2E, and the through-hole 2b of the lead-wire-fixed portion 64. As shown in FIG. 3, the first attachment 1A is inscribed in the inside wall 64a of the lead-wire-fixed portion 64, and the first attachment 2A is inscribed in the inside wall 64b of the lead-wire-fixed portion 64. The first attachment 1A and second attachment 2A are provided so as to stand on a stator-winding mounting board 11.

The through-hole 2b is formed inside the protrusion 3b composed of the protrusions 3b1 and 3b2, and the lead wire 57 is made to pass in the through-hole as described above. The lead wire 57 is connected to the stator-winding mounting board 11 by soldering, etc. Furthermore, a fixing pin 10 for fixing the end portion 59 of a stator winding provided on a ring-shaped yoke member not illustrated is provided so as to stand on the stator-winding mounting board 11. The stator-winding mounting board 11 is arranged such that the lead wire 57 connected to the stator-winding mounting board 11 does not touch a bottom portion BT of the lead-wire-fixed portion 64 due to the protrusion 13 having a through-hole formed in the bottom portion BT of the lead-wire-fixed portion.

The fixing pin 10 passes through the through-hole of the protrusion 13 and is made to jut out of the bottom portion BT of the lead-wire-fixed portion 64. The end portion 59 of the stator winding is wound around the fixing pin 10 jutted out of such a bottom portion BT.

Figure 4:
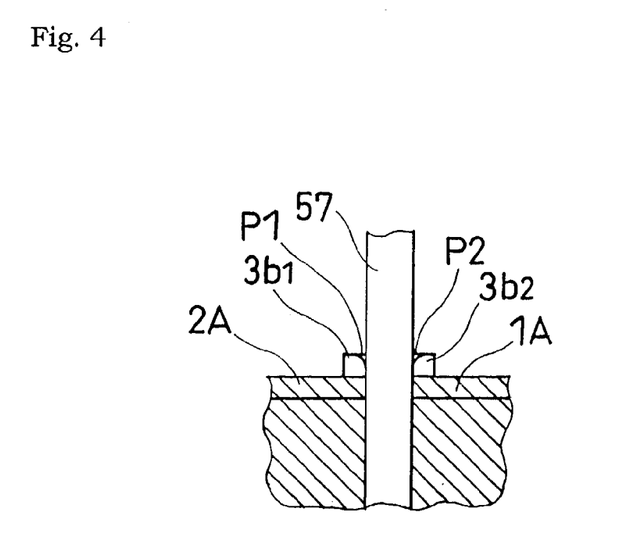
FIG. 4 is an enlarged view of a protrusion of the first attachment and the second attachment.

FIG. 4 is an enlarged view of the protrusions 3b1 and 3b2 of the first attachment 1A and second attachment 2A. Portions P1 and P2 where the protrusions 3b1 and 3b2 are in contact with the lead wire 57 are chamfered. That is, after the potting material has been cured, the edge of the potting material is sharpened. Because of this, when the lead wire 57 is bent, the lead wire 57 is likely to be damaged such as a break, a short circuit, etc. For avoiding such troubles, the portions P1 and P2 are chamfered so that the portions P1 and P2 contacting the lead wire 57 may not cause any trouble when the lead wire 57 is bent.

Figure 5:
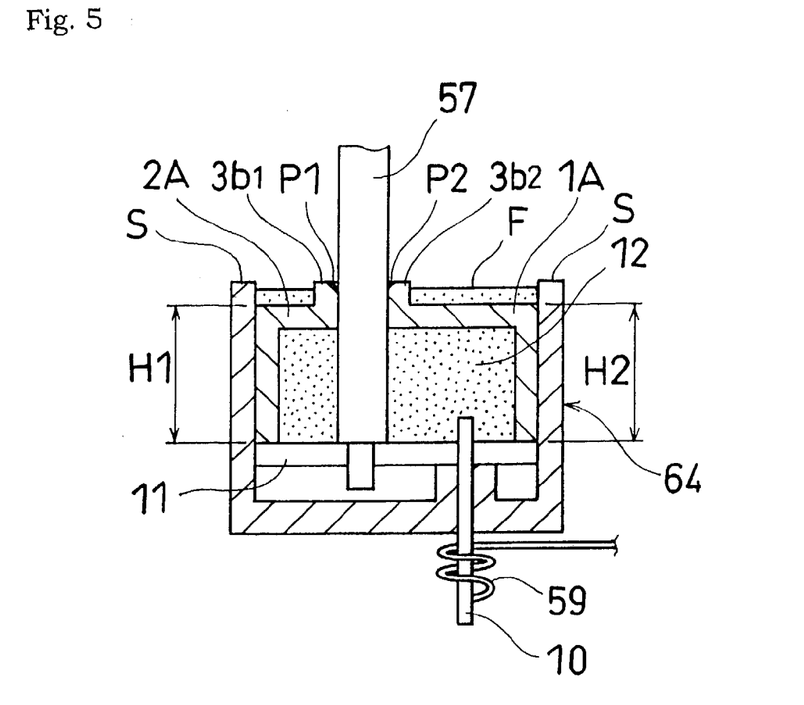
FIG. 5 shows the state when a potting material is poured into the lead-wire-fixed portion.

FIG. 5 shows the state where the first attachment 1A and second attachment 2A, and the stator-winding mounting board 11 and the fixing pin 10 provided so as to stand thereon are inserted inside the lead-wire-fixed portion 64 as in FIG. 3 and the potting material is filled. As shown in FIG. 5, the potting material 12 is poured from the inlet passage (shown by reference numeral 5 in FIG. 1) for pouring the potting material 12. Then, the potting material 12 is poured up to the surface F so as not to exceed the upper end surface of the protrusions 3a2, 3b2, 3c2, and 3d2 formed in the first attachment 1A and second attachment 2A. The potting material 12 flows to the top surface of the first attachment 1A and second attachment 2A from the outlet passages 4a, 4b, 4c, 4d, and 4e and is poured inside the lead-wire-fixed portion 64 and up to the upper end of the lead-wire-fixing attachment 1.

A surface F is the level not exceeding an upper end portion S of the lead-wire-fixed portion 64 and not exceeding the portions P1 and P2 where the protrusions 3a2, 3b2, 3c2, and 3d2 of the through-holes provided at the upper end of the lead-wire-fixing attachment 1 are chamfered.

Figure 6:
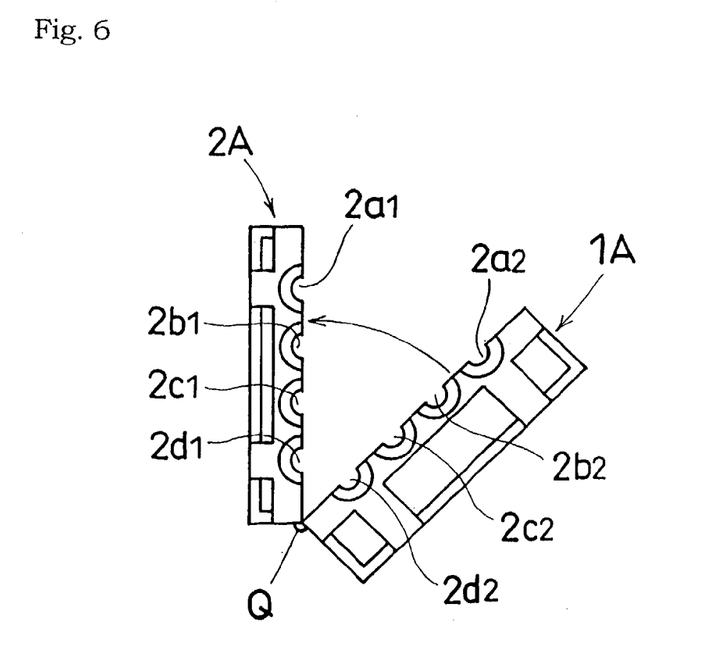
FIG. 6 shows another embodiment of a lead-wire-fixing attachment for fixing a lead wire.

FIG. 6 shows another embodiment of the lead-wire-fixing attachment 1 for fixing the lead wires. The first attachment 1A and second attachment 2A are combined together so as to be opened and closed at one end Q of the surfaces on which the notches 2a1, 2b1, 2c1, and 2d1 and notches 2a2, 2b2, 2c2, and 2d2 of the first attachment 1A and second attachment 2A are contained. Such a combination may be made by an integral molding so that the first attachment 1A and second attachment 2A may be combined together by using PBT resin, polycarbonate resin, thermoplastic resin, etc., and by using one-component epoxy resin, two-component epoxy resin, etc., as a potting material, and they may be also combined together by providing a combining portion so that the combining portion can be opened and closed by using a connection component.

According to a lead terminal structure of a resolver of the present invention, the assembling efficiency of which is improved and the mass productivity of which is excellent by providing a lead-wire-fixing attachment, in which through holes for fixing lead wires are provided at the upper end and that the inside of the lead-wire-fixed portion is filled with a potting material.

According to a lead terminal structure of a resolver of the present invention, the lead-wire-fixing attachment is formed by a first attachment and a second attachment for fixing the lead wires and through-holes for fixing the lead wires are formed by notches provided at the position where the first attachment and the second attachment contact each other, and accordingly the lead wires can be easily fixed to a stator-winding mounting board.

According to a lead terminal structure of a resolver of the present invention, the amount of a potting material to be poured can be easily controlled such that an inlet passage for pouring a potting material and outlet passages through which the poured potting material flows out to the upper portion of the lead-wire-fixing attachment are provided.

According to a lead terminal structure of a resolver of the present invention, since the thermal expansion coefficient of the lead-wire-fixed portion, the lead-wire-fixing attachment, and the potting material is substantially equal, a break of the lead wires and the occurrence of a space between parts are prevented and a high-quality resolver can be obtained.

According to a lead terminal structure of a resolver of the present invention, in the lead-wire-fixing attachment, since base portions which are inscribed in the inside wall of he lead-wire-fixed portion are formed, the lead-wire-fixing attachment can be easily positioned.

According to a lead terminal structure of a resolver of the present invention, in the lead-wire-fixing attachment, since a protrusion is formed in the through-hole provided at the upper end of the lead-wire-fixing attachment and the portion where the protrusion and the lead wire are in contact with each other is chamfered, and according to a lead terminal structure of a resolver of the present invention, since the potting material poured inside the lead-wire-fixed portion comes to a level not exceeding the upper end portion of the lead-wire-fixed portion and to a level a little lower than the portion where the protrusion of the through-hole provided at the upper end of the lead-wire-fixing attachment, the damages due to the bending operation of the lead wire, a break of the lead wire, a short circuit, etc., can be eliminated.

According to a lead terminal structure of a resolver of the present invention, in the lead-wire-fixing attachment, since the first attachment and second attachment for fixing the lead wire are combined so that both attachments may be opened and closed at one end of the surfaces having the notches thereof, the alignment of both attachments becomes unnecessary and the number of man-hour for the assembly can be reduced.

What is claimed is:

1. A lead terminal structure of a resolver comprising; a ring-shaped stator core in which a fixed magnetic pole having a plurality of fixed pole shoes is protruded in the direction of the center of a ring-shaped yoke member and a plurality of plate-like members are laminated; a lead-wire-fixed portion in which a stator winding wound around the fixed pole shoes of the stator core is connected to a lead wire; a stator-winding mounting board, on which a fixing pin for fixing the stator winding is arranged so as to stand thereon, provided in the lead-wire-fixed portion; and a lead-wire-fixing attachment, at the upper end of which at least one through-hole for fixing the lead wire is provided, arranged above the stator-winding mounting board, wherein the lead wire is connected to the stator-winding mounting board by way of the through-hole, the lead-wire-fixed portion is filled with a potting material, the lead-wire-fixing attachment is formed by a first attachment and a second attachment, the first attachment includes at least one first notch provided along a first contacting surface of the first attachment, the second attachment includes at least one second notch provided along a second contacting surface of the second attachment, each of the through-holes is formed by corresponding ones of the first notch and the second notch when the first contacting surface is in contact with the second contacting surface, and the first attachment and the second attachment are connected at corresponding ends thereof by a connection that allows for the first contacting surface of the first attachment and the second contacting surface of the second attachment to be moved toward each other to form the respective notches, and to be moved away from each other to open the respective notches, wherein the lead wire connected to the stator-winding mounting board does not touch a bottom portion of the lead-wire-fixed portion due to a protrusion with a through-hole formed at the bottom portion of the lead-wire-fixed portion.

2. The lead terminal structure of a resolver as claimed in claim 1, wherein an inlet passage for pouring a potting material and an outlet passage for the poured potting material to run out are provided in the upper portion of the lead-wire-fixing attachment.

3. The lead terminal structure of a resolver as claimed in claim 1, wherein each of the lead-wire-fixed portion, the lead-wire-fixing attachment, and the potting material has a substantially equal thermal expansion coefficient.

4. The lead terminal structure of a resolver as claimed in claim 1, wherein base portions inscribed in the inside wall of the lead-wire-fixed portion are formed in the lead-wire-fixing attachment.

5. The lead terminal structure of a resolver as claimed in claim 1, wherein a chamfered protrusion is formed at the upper end of the lead-wire-fixing attachment in such a manner that a poured potting material stays between an upper end of the lead-wire-fixing attachment and an upper end surface of the protrusion.

6. The lead terminal structure of a resolver as claimed in claim 1, wherein the lead-wire-fixed portion is filled with a potting material such that the potting material does not exceed the upper end of the lead-wire-fixed portion and that the potting material does not exceed the portion, which is chamfered, of the protrusion of a through-hole provided at the upper end of the lead-wire-fixing attachment.

7. The lead terminal structure of a resolver as claimed in claim 1, wherein corresponding portions of the first notch and the second notch face each other and the through-hole is formed between the corresponding portions.

8. The lead terminal structure of a resolver as claimed in claim 1, wherein the first attachment and the second attachment are connected via a resin.

9. The lead terminal structure of a resolver as claimed in claim 1, wherein the first attachment and the second attachment are connected via a connection component.

10. The lead terminal structure of a resolver as claimed in claim 9, wherein the resin is at least one of PBT resin, a polycarbonate resin and a thermoplastic resin.

11. The lead terminal structure of a resolver as claimed in claim 1, wherein the lead-wire-fixing attachment, making the first attachment and the second attachment attached to each other, forms through-holes as well as inlet and outlet passages through which the potting material flows in and out respectively.

* * * * *